US009503507B2

(12) United States Patent
Soelberg et al.

(10) Patent No.: US 9,503,507 B2
(45) Date of Patent: *Nov. 22, 2016

(54) SYSTEM, APPARATUS AND METHODS FOR STORING LINKS TO MEDIA FILES IN NETWORK STORAGE

(75) Inventors: Emily Lyons Soelberg, Atlanta, GA (US); Justin M. McNamara, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 554 days.

This patent is subject to a terminal disclaimer.

(21) Appl. No.: 13/585,434

(22) Filed: Aug. 14, 2012

(65) Prior Publication Data

US 2013/0041771 A1    Feb. 14, 2013

Related U.S. Application Data

(63) Continuation of application No. 12/768,863, filed on Apr. 28, 2010, now Pat. No. 8,244,834, which is a continuation of application No. 11/127,385, filed on May 12, 2005, now Pat. No. 7,734,732.

(51) Int. Cl.
*G06F 21/00* (2013.01)
*H04L 29/08* (2006.01)
*H04L 29/06* (2006.01)

(52) U.S. Cl.
CPC .............. *H04L 67/06* (2013.01); *H04L 63/08* (2013.01); *H04L 63/10* (2013.01); *H04L 67/1095* (2013.01); *H04L 67/306* (2013.01)

(58) Field of Classification Search
CPC ................................................ G06Q 2220/12

USPC ........................................................... 705/52
See application file for complete search history.

(56) References Cited

U.S. PATENT DOCUMENTS

| 666,231 A | 1/1901 | Lawson |
|---|---|---|
| 5,924,070 A | 7/1999 | Ittycheriah et al. |
| 6,662,231 B1 * | 12/2003 | Drosset et al. ............... 709/229 |
| 6,839,707 B2 * | 1/2005 | Lee .................... G06F 17/30011 |
| 7,116,894 B1 | 10/2006 | Chatterton |
| 7,116,984 B1 | 10/2006 | Muhonen et al. |
| 7,373,345 B2 * | 5/2008 | Carpentier et al. |
| 7,502,606 B2 | 3/2009 | Flynt et al. |
| 8,244,834 B2 * | 8/2012 | Soelberg et al. ............. 709/219 |
| 2002/0082054 A1 | 6/2002 | Keinonen et al. |

(Continued)

OTHER PUBLICATIONS

U.S. Office Action dated Aug. 22, 2011 in U.S. Appl. No. 12/768,863.

(Continued)

*Primary Examiner* — Charles C Agwumezie
(74) *Attorney, Agent, or Firm* — Hartman & Citrin LLC

(57) ABSTRACT

When a user purchases digital rights to a media file, or otherwise obtains the right to have a copy of the media file downloaded to the user's wireless device, a link to the media file that is stored in the media database is stored in a user storage database. When the user desires to have the media file downloaded to the user's wireless device, the user sends a request to the network. The network performs a check to determine whether the user is authorized to receive the requested media file, and if so, causes the requested media file to be downloaded to the user's wireless device where the media file is stored in the local memory of the wireless device for playback by the user on the wireless device.

15 Claims, 4 Drawing Sheets

(56) References Cited

U.S. PATENT DOCUMENTS

| | | |
|---|---|---|
| 2003/0005138 A1 | 1/2003 | Giffin et al. |
| 2004/0220975 A1 | 11/2004 | Carpentier et al. |
| 2005/0021539 A1 | 1/2005 | Short et al. |
| 2005/0059418 A1 | 3/2005 | Northcutt |
| 2005/0130641 A1 | 6/2005 | Lorraine Scott |
| 2005/0144253 A1* | 6/2005 | Yoshino .................. G06F 21/10 709/217 |
| 2006/0068816 A1 | 3/2006 | Pelaez et al. |
| 2006/0155803 A1* | 7/2006 | Muramatsu ........... H04L 67/303 709/203 |
| 2006/0195506 A1* | 8/2006 | Deng .................... H04L 51/066 709/203 |
| 2006/0229063 A1 | 10/2006 | Koch |
| 2006/0242210 A1 | 10/2006 | Ring et al. |
| 2006/0291455 A1 | 12/2006 | Katz et al. |
| 2007/0074240 A1 | 3/2007 | Addington et al. |
| 2008/0216139 A1* | 9/2008 | Liwerant et al. ............. 725/113 |

OTHER PUBLICATIONS

U.S. Notice of Allowance dated Apr. 4, 2012 in U.S. Appl. No. 12/768,863.

U.S. Office Action dated Jun. 20, 2008 in U.S. Appl. No. 11/127,385.

U.S. Office Action dated Dec. 10, 2008 in U.S. Appl. No. 11/127,385.

U.S. Advisory Action dated Feb. 26, 2009 in U.S. Appl. No. 11/127,385.

U.S. Office Action dated Mar. 19, 2009 in U.S. Appl. No. 11/127,385.

U.S. Office Action dated Sep. 25, 2009 in U.S. Appl. No. 11/127,385.

U.S. Notice of Allowance dated Feb. 2, 2010 in U.S. Appl. No. 11/127,385.

D.James Gimmell, Harrick M.Vin, Dilip D. Kandlur, P. Venkat Rangan, Lawrence A. Rowe, Multimedia Storage Servers: A Tutorial, May 1995, 23 pages.

* cited by examiner

SYSTEM, APPARATUS AND METHODS FOR STORING LINKS TO MEDIA FILES IN NETWORK STORAGE

This application is a continuation of U.S. patent application Ser. No. 12/768,863, filed Apr. 28, 2010, now U.S. Pat. No. 8,244,834, which is a continuation of U.S. patent application Ser. No. 11/127,385, filed May 12, 2005, now U.S. Pat. No. 7,734,732, the contents of which are hereby incorporated by reference herein in their entirety into this disclosure.

BACKGROUND OF THE INVENTION

1. Field of the Invention

The invention relates to wireless technology. More particularly, the invention relates to a system in which links to media files are stored in network storage to obviate the need to store multiple copies of media files in network storage.

2. Description of the Related Art

Third generation (3G) wireless networks provide high-speed data transmission and make it easier for users to download content such as songs, videos, games and graphics. As these networks are launched, one of the constraints on downloading content is device memory capacity. Generally, users have two options when they run low on memory. One option is to copy local files to removable storage media. The other option is to store content at the network level that they can later access to retrieve the content.

As more and more people purchase content that they store in network storage, the network could potentially store multiple copies of the same file, which is a waste of network resources. For example, if 1,000 people store the same music selection in a network provider's media database, the network provider's resources are wasted.

A need exists for a method and apparatus that obviate the need to store multiple copies of the same file in network storage.

SUMMARY OF THE INVENTION

The invention provides an apparatus, a system and a method for storing links to media files in network storage that are used to access media files stored in network storage. The system comprises a user storage database having links to media files stored therein, a media storage database having media files stored therein, authentication logic that determines whether a user is authorized to receive one or more media files, and download logic. The download logic receives a request to send a media file to a wireless device. The request includes a link associated with a media file and an identifier that identifies the wireless device to which the media file is to be sent. The download logic uses the link included in the request to retrieve the media file associated with the link from the media storage database. The download logic sends the retrieved media file to the identified wireless device if the authentication logic determines that a user associated with the identified wireless device is authorized to receive the media file.

The method of the invention comprises storing links to media files in a user storage database, storing media files in a media storage database, receiving a request from a wireless device to download a media file to the wireless device, determining whether or not a user associated with the wireless device is authorized to receive the media file associated with the link included in the request, and if a determination is made that the user is authorized to receive the media file associated with the link included in the request, retrieving the media file associated with the link from the media storage database and sending the retrieved media file to the wireless device.

The apparatus of the invention is a wireless device comprising upload logic for uploading a link to a media file to network storage. The upload logic comprises first logic configured to receive a request to move a media file from local memory of the wireless device to network storage, second logic configured to interpret the request as a request to store a link to the media file in network storage, and third logic configured to cause a request to store the link in network storage to be sent to the network.

The invention also provides a method for uploading a link to a media file from a wireless device to network storage. The method comprises receiving a request in a wireless device to move a media file from local memory of the wireless device to network storage, interpreting the request received in the wireless device as a request to store a link to the media file in network storage, and generating a request in the wireless device to store a link to the media file in network storage.

These and other features and advantages of the invention will become apparent from the following description, drawings and claims.

DETAILED DESCRIPTION OF EXEMPLARY EMBODIMENTS

In accordance with the invention, media files are saved in a media database in a network. Preferably, no more than a single copy of any given media file is stored in the media database, which prevents network resources from being wasted due to storing multiple copies of the same media file. When a user purchases digital rights to a media file, or otherwise obtains the right to have a copy of the media file downloaded to the user's wireless device, a link to the media file that is stored in the media database is stored in a user storage database. When the user desires to have the media file downloaded to the user's wireless device, the user sends a request to the network. The network performs a check to determine whether the user is authorized to receive the requested media file. This may be accomplished by, for example, determining whether a link to the requested file is stored in the user storage database for the user. If a determination is made that the user is authorized to receive the requested media file, the requested media file is sent to the user's wireless device where the media file is stored in the local memory of the wireless device for playback by the user on the wireless device.

Figure 1:
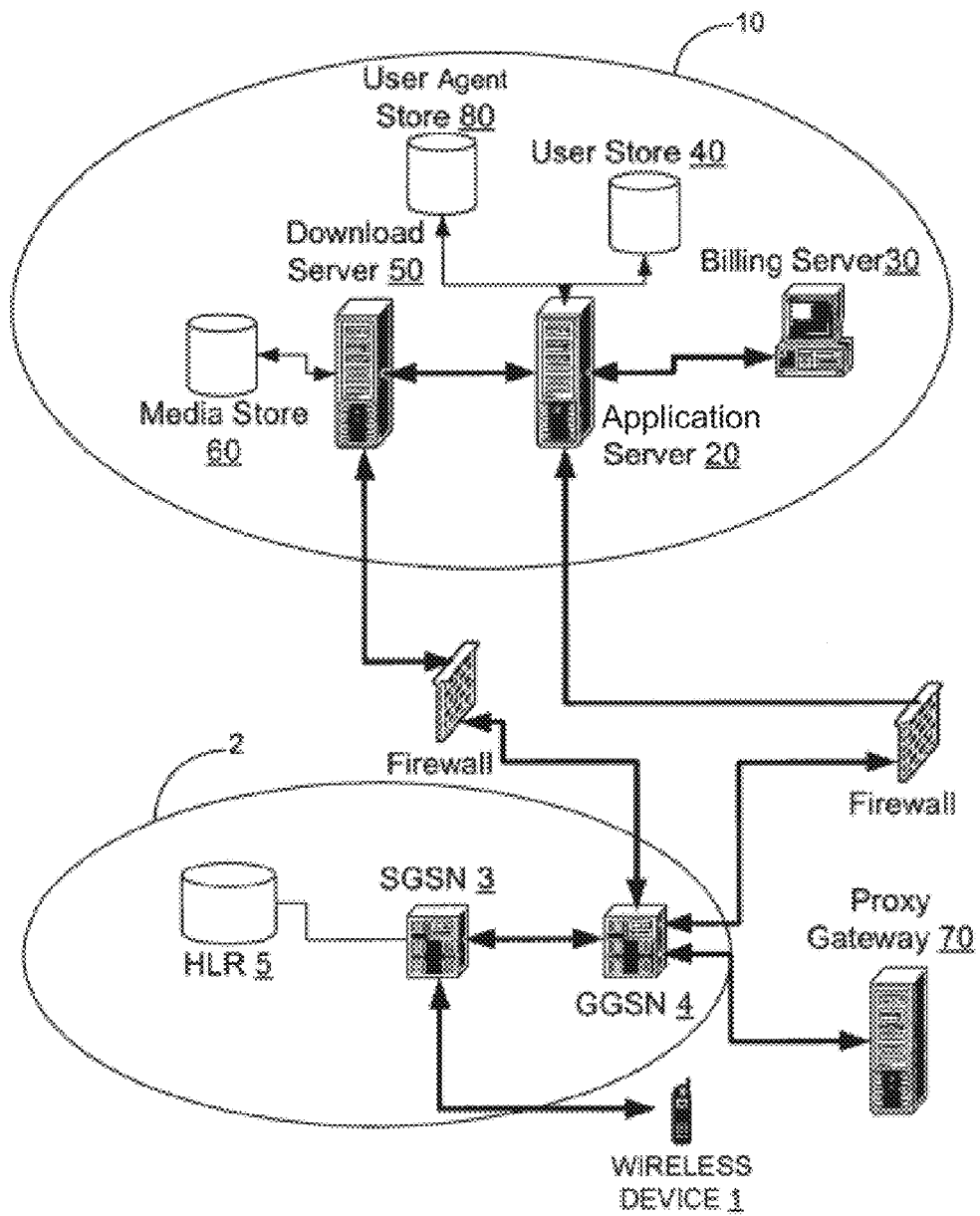
FIG. 1 illustrates a block diagram of the system of the invention for enabling users to store links to files in network storage, which are subsequently used to cause the files associated with the links to be downloaded to the user's mobile device.

FIG. 1 illustrates a block diagram of the system 10 of the invention for storing links to media files that can be subsequently used to cause media files to be downloaded to a user's wireless device 1. The wireless device 1 may be any type of wireless device having the functionality for storing a media file and playing back the media file, such as, for example, a wireless telephone, which typically are not capable of storing a large number of media files (e.g., musical selections) in local memory.

The manner in which the system 10 of the invention operates in accordance with an exemplary embodiment will now be described with reference to FIG. 1. The system 10 may comprise components that are connected to a public network, such as the Internet, for example. Alternatively, the system 10 may comprise components that are connected to a private network. Typically, all of the system components that communicate with each other have Internet Protocol (IP) addresses, regardless of whether they are connected to the Internet or to a private network.

In order to store links to media files in network storage, a user sends a request to store links to the application server 20 via a wireless packet-switched network 2, which is typically a General Packet Radio Services (GPRS) network, but may be any type of packet-switched network. The process of sending the request is performed by a client processor residing on the wireless device 1. A Serving GPRS Support Node (SGSN) 3 performs tunneling and detunneling of Internet Protocol packets and mobility management functions. A Gateway GPRS Support Node (GGSN) 4 detunnels data packets received from the SGSN 3 and routes them to an application server 20 of the system 10. The packets are sent from the wireless device 1, through the GGSN 4 to the application server 20 in a Hypertext Transfer Protocol (HTTP) session using Transmission Control Protocol/Internet Protocol (TCP/IP). The application server 20 has an IP address to which the GGSN 4 sends the packets.

The wireless device 1 may also include functionality that enables it to access the application server 20 through a proxy gateway 70. This will allow the proxy gateway 70 to add subscriber identification information to the packets (e.g., the Mobile Station Integrated Services Digital Network (MSISDN) number of the wireless device 1). In this case, the wireless device 1 also passes User Agent (UA) header information in the HTTP request that will allow the application server 20 to determine which wireless device 1 the subscriber is currently using. The user agent storage database 80 contains profile information about user devices, which includes information about the capabilities of the devices. The application server 20 uses the UA header information to retrieve profile information from the user agent storage database 80. The application server 20 uses the retrieved profile information to identify the capabilities of the wireless device 1. Based on the retrieved profile information, logic contained in the download server 50 translates, if necessary, files retrieved from the media storage database 60 into files that the user's wireless device 1 is capable of playing back.

When the application server 20 receives the request to store links, the application server 20 performs an authentication algorithm to determine whether the user has a subscription to use the system 10 and/or to determine whether or not the user has purchased the digital rights (e.g., license keys) for the media files associated with the links. The application server 20 may query a billing server 30 for user authentication and paid subscriptions. If the user has not purchased digital rights and/or has not purchased a subscription, the billing server 30 may charge a monetary amount to an account associated with the user.

Once the application server 20 has performed authentication, it stores the links in the user storage database 40 in a location associated with the user. For example, the Mobile Station Integrated Services Digital Network (MSISDN) of the user's wireless device 1 may be translated into an address that is used to access the user storage database 40. Other identifiers may be used for this purpose, such as, for example, the International Mobile Subscriber Identity (IMSI) associated with user's wireless device 1.

The links may be the names of the media files (e.g., the title of a music selection), which would be translated by the download server into addresses in the media storage database 60. Once the links have been stored in the local storage of the wireless device 1, they are available to be bundled into link storage requests and sent to the application server 20 for storage in the user storage database 40. A link can be anything that can be used to access a file on a network, including a hyperlink, a file name, a database address, etc.

When the user wants to have a media file downloaded to the local storage on the user's wireless device 1, the user sends a download request via wireless network 2 to the download server 50 of system 10. The download request includes the link or links to the media files to be downloaded and a user identifier, such as the MSISDN or IMSI associated with the user's wireless device 1. The download server 50 forwards the download request to the application server 20, which then checks the user storage database 40 to determine whether the links are stored in the location in the user storage database 40 associated with the user. If so, the application server 20 informs the download server 50 that the user has authorization for the requested media file or files. The download server 50 then causes the requested media files to be retrieved from the media storage database 60 and downloaded to the user's wireless device. The SGSN 3 checks the HLR 5 to determine the location of the wireless device 1 so that the files can be downloaded to the user's wireless device 1 even when the wireless device 1 is roaming.

Before the user can send a request to store links to the application server 20, the user first obtains the links. This can be accomplished in a number of ways. One way to do this is to allow the user to search the media storage database 60. In order to perform a search, the user sends a search request to the download server 50 via the wireless network 2. The download server 50 retrieves a list of media files from the media storage database 60, and sends the list to the user's wireless device 1. The list is then displayed on a display device (not shown) of the wireless device 1. The user is able to peruse the list and make selections using an input device (e.g., a keypad) of the wireless device 1. When the user selects media files, the links associated with the media files are saved in the local memory of the wireless device 1. The locally stored links are subsequently uploaded to the application server 20 to cause the associated media files to be downloaded by the download server 50 to the user's wireless device 1.

Figure 2:
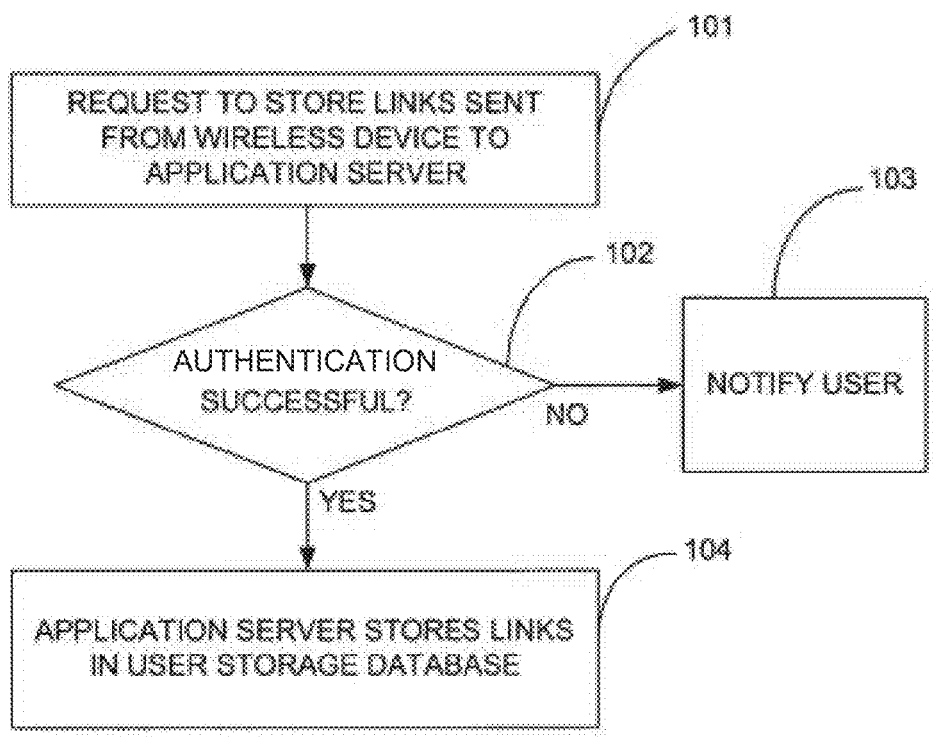
FIG. 2 illustrates a flow chart that represents the method of the invention in accordance with an embodiment for storing links in a user storage database shown in FIG. 1.

FIG. 2 illustrates a flow chart that represents the method of the invention in accordance with an embodiment for storing links in a user storage database 40. The user sends a request to store links to application server 20, as indicated by block 101. The application server 20 performs authentication, as indicated by block 102. If authentication is not successful, the user is notified and may be given an opportunity to pay or authorize payment in order to satisfy authentication requirements, as indicated by block 103. If authentication is successful, the application server 20 stores the links in the user storage database 40 in a location associated with the user or with the user's wireless device 1, as indicated by block 104.

Figure 3:
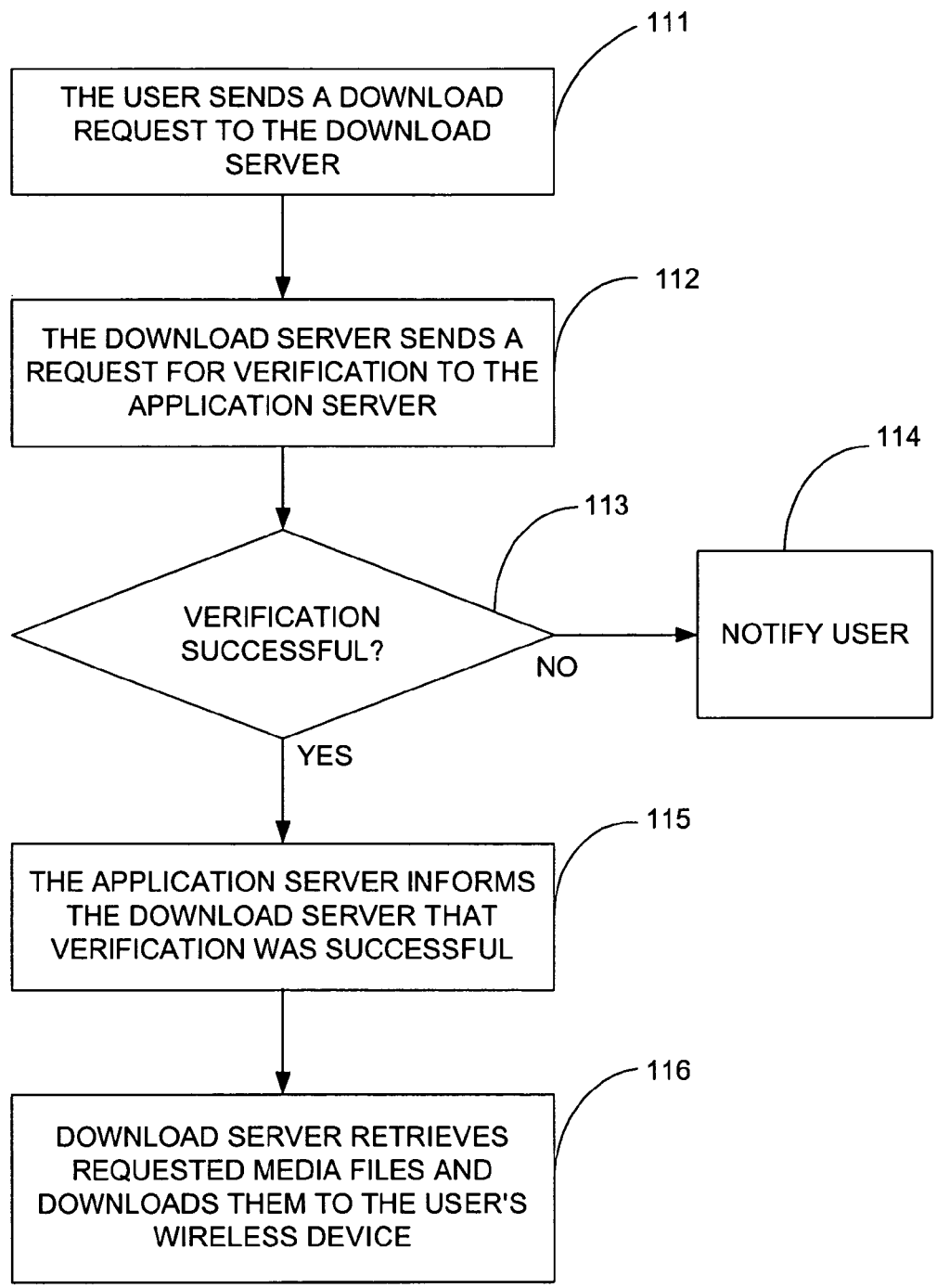
FIG. 3 illustrates a flow chart that represents the method of the invention in accordance with an embodiment for downloading media files from the media storage database shown in FIG. 1.

FIG. 3 illustrates a flow chart that represents the method of the invention in accordance with an embodiment for requesting downloading of media files. The user sends a download request to the download server 50, as indicated by block 111. The download server 50 sends a request for verification to the application server 20, as indicated by block 112. The verification request is a request to verify that the user is authorized to have the requested media file or files downloaded to the user's wireless device 1. The application server 20 checks the user storage database 40 to determine whether links associated with the requested media files are stored in the user storage database 40, as indicated by block 113. If not, a message is sent to the user's wireless device 1 indicating that the user is not authorized to have one or more of the requested media files downloaded, as indicated by block 114. The user may be informed as to how to obtain authorization for the unauthorized media files. If verification is successful, the application server 20 informs the download server 50 that the user has authorization for the requested media files, as indicated by block 115. The download server 50 then retrieves the requested media file or files from the media storage database 60 and downloads them to the local storage of the user's wireless device, as indicated by block 116.

Figure 4:
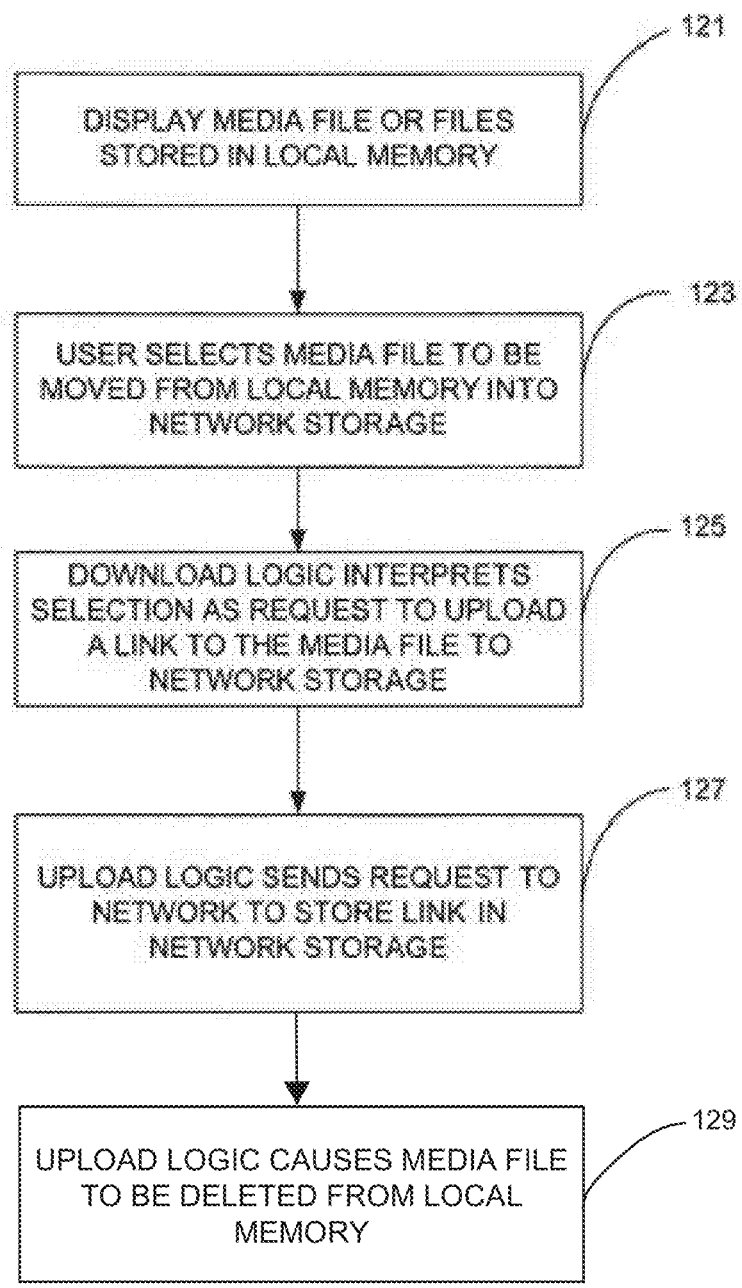
FIG. 4 illustrates a flow chart that represents the method of the invention in accordance with an embodiment for uploading links to media files from the user's wireless device to the user storage database.

In some cases, a user may have already purchased from some source and downloaded the media file to the user's wireless device 1. Because local memory of the wireless device 1 is typically not sufficiently large enough to store a large number of media files, the user may want to store the media file in network storage and delete it from local memory. FIG. 4 illustrates a block diagram that represents the method of the invention in accordance with an embodiment, for storing a link to the media file, rather than the media file itself, in network storage.

The wireless device 1 in accordance with the invention includes upload logic that processes a user request to move a media file from the local memory of the wireless device 1 into network storage. To accomplish this, the user causes the title of the media file, or some other identifier that identifies the media file, to be displayed on the display device of the wireless device 1, as indicated by block 121. The user then makes an appropriate selection to cause the media file to be moved from local storage to network storage, as indicated by block 123. Steps 121 and 123 will typically be performed by using an input device, such as a keypad, of the wireless device 1 to make appropriate selections. For example, the user may press a button or series of buttons on the keypad to cause all media files stored in local memory to be displayed and another button or series of buttons to select a particular media file or files to be moved from local storage to network storage.

When the user makes a selection to move a media file from local storage to network storage, the upload logic of the wireless device 1 interprets this selection as a request to store a link to the media file in network storage, as indicated by block 125. The upload logic then causes the link to be sent to the application server 20, which stores the link in the user storage database 40 at a location associated with the user, as indicated by block 127. The upload logic preferably also causes the media file to be deleted from the local memory of the wireless device 1, as indicated by block 129.

That the link rather than the media file itself is uploaded to network storage need not be apparent to the user. For example, the user may make a selection that indicates that the media file is being uploaded to network storage, although only the link is actually uploaded. In addition to the steps shown in FIG. 4, the application server 20 may perform authentication or verification process as described above to ensure that the user is a subscriber to the system 10, or is otherwise authorized to use the corresponding media file.

It should be noted that the invention is not limited to the embodiments described above with reference to FIGS. 1-4. Modifications may be made to the embodiments described herein and all such modifications are within the scope of the invention. For example, particular tasks have been described as being performed by particular network elements, e.g., the application server 20 and the download server 50. These tasks may be performed by a single component, e.g., a single server instead of by multiple network components. The invention is not limited to particular tasks being performed by particular network elements. Other modifications may be made to the embodiments described herein and all such modifications are within the scope of the invention.

The invention claimed is:

1. A server comprising:
a processor; and
a memory that stores instructions that, when executed by the processor, cause the processor to perform operations comprising
receiving a search request from a wireless device comprising a local memory storing a media file,
in response to receiving the search request from the wireless device,
retrieving a list of media files from a media storage database, and
sending the list of media files to the wireless device for display by the wireless device, wherein when a user of the wireless device selects the media file from the list of media files, a link associated with the media file is saved on the local memory of the wireless device,
after the link associated with the media file is saved on the local memory of the wireless device, receiving, from the wireless device, the link associated with the media file, wherein the media file is deleted from the local memory of the wireless device upon the wireless device sending the link to the server,
in response to receiving the link from the wireless device, determining whether the user of the wireless device has purchased digital rights for the media file associated with the link,
in response to determining that the user has purchased the digital rights for the media file associated with the link, storing the link in a location of a user storage database associated with the wireless device of the user,
after storing the link in the location of the user storage database associated with the wireless device of the user, receiving, from the wireless device, a download request to download the media file to the wireless device, the download request comprising the link associated with the media file and an identifier associated with the wireless device,
in response to receiving the download request, verifying that the wireless device is authorized to receive the media file by determining whether the link of the download request is stored in the location of the user storage database associated with the wireless device of the user, and in response to determining that the link of the download request is stored in the location of the user storage database associated with the wireless device of the user, retrieving a copy of the media file from the media storage database, and transmitting the copy of the media file to the wireless device.

2. The server of claim 1, wherein storing the link associated with the media file in the location of the user storage database associated with the wireless device of the user comprises translating a mobile station integrated services digital network number of the wireless device into an address used to access the location of the user storage database associated with the wireless device of the user.

3. The server of claim 1, wherein the link comprises a hyperlink.

4. A system comprising:

a media storage database, the media storage database storing no more than one copy of each of a plurality of media files;

a user storage database; and a server comprising a processor, and a memory that stores instructions that, when executed by the processor, cause the processor to perform operations comprising receiving a search request from a wireless device comprising a local memory storing a media file, in response to receiving the search request from the wireless device, retrieving a list of media files from the media storage database, and sending the list of media files to the wireless device for display by the wireless device, wherein when a user of the wireless device selects the media file from the list of media files, a link associated with the media file is saved on the local memory of the wireless device, after the link associated with the media file is saved on the local memory of the wireless device, receiving, from the wireless device, the link associated with the media file, wherein the media file is deleted from the local memory of the wireless device upon the wireless device sending the link to the server, in response to receiving the link from the wireless device, determining whether the user of the wireless device has purchased digital rights for the media file associated with the link, in response to determining that the user has purchased the digital rights for the media file associated with the link, storing the link in a location of the user storage database associated with the wireless device of the user, after storing the link in the location of the user storage database associated with the wireless device of the user, receiving, from the wireless device, a download request to download the media file to the wireless device, the download request comprising the link associated with the media file and an identifier associated with the wireless device, in response to receiving the download request, verifying that the wireless device is authorized to receive the media file by determining whether the link of the download request is stored in the location of the user storage database associated with the wireless device of the user, and in response to determining that the link of the download request is stored in the location of the user storage database associated with the wireless device of the user, retrieving, from the media storage database, a copy of the media file, and transmitting the copy of the media file to the wireless device.

5. The system of claim 4, further comprising a billing server.

6. The system of claim 5, wherein determining whether the user of the wireless device has purchased the digital rights for the media file associated with the link is based on information provided by the billing server.

7. The system of claim 5, wherein the billing server associates the wireless device with a paid subscription.

8. The system of claim 4, further comprising a user agent storage database that stores profile information associated with the wireless device.

9. The system of claim 8, wherein the profile information of the wireless device identifies capabilities of the wireless device.

10. The system of claim 9, wherein the operations further comprise:

retrieving the profile information of the wireless device identifying the capabilities of the wireless device; and prior to transmitting the copy of the media file to the wireless device, translating, based on the capabilities of the wireless device, the copy of the media file for playback by the wireless device.

11. The system of claim 4, wherein the link comprises a hyperlink.

12. A method comprising:

receiving, by a server comprising a processor, a search request from a wireless device comprising a local memory storing a media file;

in response to receiving the search request from the wireless device, retrieving, by the server, a list of media files from a media storage database, and sending, by the server, the list of media files to the wireless device for display by the wireless device, wherein when a user of the wireless device selects the media file from the list of media files, a link associated with the media file is saved on the local memory of the wireless device, after the link associated with the media file is saved on the local memory of the wireless device, receiving, by the server, from the wireless device, the link associated with the media file, wherein the media file is deleted from the local memory of the wireless device upon the wireless device sending the link to the server;

in response to receiving the link from the wireless device, determining, by the server, whether the user of the wireless device has purchased digital rights for the media file associated with the link;

in response to determining that the user has purchased the digital rights for the media file associated with the link, storing, by the server, the link in a location of a user storage database associated with the wireless device of the user;

after storing the link in the location of the user storage database associated with the wireless device of the user, receiving, by the server, from the wireless device, a download request to download the media file, the download request comprising the link associated with the media file and an identifier associated with the wireless device;

in response to receiving the download request, verifying, by the server, that the wireless device is authorized to receive the media file by determining, by the server, whether the link of the download request is stored in the location of the user storage database associated with the wireless device of the user; and in response to determining that the link of the download request is stored in the location of the user storage database associated with the wireless device of the user, retrieving, by the server, a copy of the media file from the media storage database, and transmitting, by the server, the copy of the media file to the wireless device.

13. The method of claim 12, further comprising prior to transmitting the copy of the media file to the wireless device, translating, based upon capabilities of the wireless device, the copy of the media file for playback by the wireless device.

14. The method of claim 12, further comprising in response to determining that the user has not purchased the digital rights for the media file associated with the link, instructing, by the server, a billing server to bill the user of the wireless device for the copy of the media file.

15. The method of claim 12, wherein the link comprises a hyperlink.

\* \* \* \* \*